United States Patent Office 2,923,746
Patented Feb. 2, 1960

2,923,746
NOVEL DERIVATIVES OF BIS(PERFLUOROALKYL) ACETYLENES

John Ferguson Harris, Jr., Wilmington, Del., assignor to E. I. du Pont de Nemours and Company, Wilmington, Del., a corporation of Delaware No Drawing. Application May 15, 1958
Serial No. 735,382

7 Claims. (Cl. 260—648)

This invention relates to new fluorine-containing cyclic compounds.

The perfluorinated hydrocarbons have become an industrially important class of compounds because they possess a combination of properties which are unmatched in any other class of compounds. For example, polytetrafluoroethylene is remarkable in its thermal and chemical stability and high melting point, and this makes it unique in applications where resistance to thermal attack is required. The fluorinated alkenes and alkanes have been the subject of extensive research and much has been learned of the effect of the fluorine function in these compounds. Comparatively little is known, however, about the perfluorinated alkynes. In a study of the perfluorinated alkynes, new cyclic derivatives have been prepared.

This invention provides a novel cyclization reaction leading to the formation of novel cyclic trimers and tetramers of bis(perfluoroalkyl)acetylenes.

The new cyclic trimers and tetramers are obtained by heating monomeric bis(perfluoroalkyl)acetylenes to between 250° and 300° C. under pressure.

In one of the embodiments of the present invention, the new cyclic trimers and tetramers of bis(perfluoroalkyl) acetylenes are obtained by the following method. A pressure reactor is flushed with nitrogen and then evacuated to remove traces of oxygen. The reactor is then charged with the bis(perfluoroalkyl)acetylene and closed. The charged reactor is heated to between 250° and 300° C. until reaction is complete, as evidenced by cessation of pressure drop. Thereafter the reactor is permitted to cool and the solid reaction product is removed. The desired products are isolated from the crude material by sublimation or other methods known to those skilled in the art.

The bis(perfluoroalkyl)acetylenes used in preparing the trimers and tetramers of this invention conform to the general formula $CF_3—(CF_2)_n—C\equiv C—(CF_2)_n—CF_3$, where $n$ is 0 to 4. Specific examples of such bis(perfluoroalkyl)acetylenes are perfluoro-2-butyne, perfluoro-2-pentyne, perfluoro-2-hexyne, and perfluoro-3-hexyne.

The cyclic derivatives of the present invention are characterized by a carbon ring structure in which three of the valences of the carbon are utilized in the formation of the ring structure and the remaining valence of the carbon is satisfied by perfluoroalkyl groups. The cyclic trimers and tetramers of the bis(perfluoroalkyl)acetylenes may thus be stated as having the general formula $C_x[(CF_2)_n—CF_3]_x$ wherein $x$ is either 6 or 8 and $n$ is a number from 0 to 4 inclusive.

The trimer from perfluoro-2-butyne, $C_{12}F_{18}$, corresponds to hexakis(trifluoromethyl)benzene which has the structure

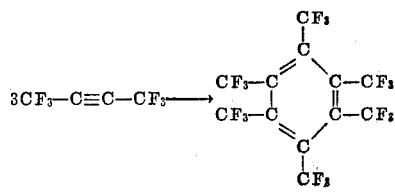

The tetramer from perfluoro-2-butyne is an octakis(trifluoromethyl)octatriene and is a colorless solid melting at 113° to 114° C., corresponding in molecular formula to $C_{16}F_{24}$. The exact structure of this compound is not known, but it is believed to be either octakis(trifluoromethyl)bicyclo-[4.2.0]-2,4,7-octatriene (I) or octakis(trifluoromethyl)bicyclo-[2.2.2]-2,5,7-octatriene (II), as follows:

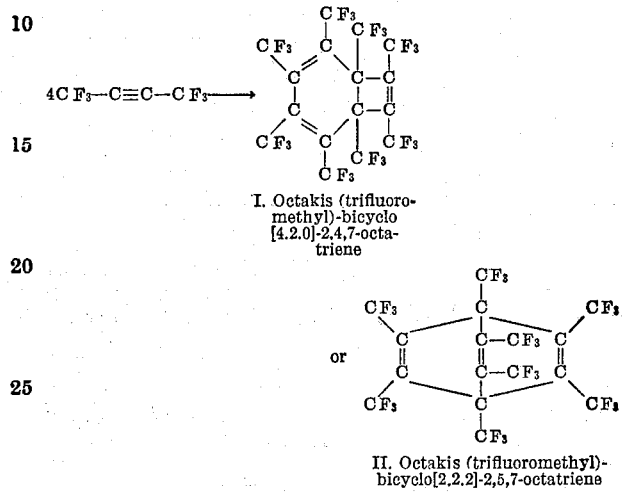

I. Octakis (trifluoromethyl)-bicyclo [4.2.0]-2,4,7-octatriene

II. Octakis (trifluoromethyl)-bicyclo[2.2.2]-2,5,7-octatriene

The examples which follow are submitted to illustrate and not to limit this invention. Parts are by weight, unless otherwise stated.

Example I

Perfluoro-2-butyne (25 parts) was charged into a stainless steel pressure reaction vessel and heated at 275° C. for a period of 9 hours. The initial pressure at 275° C. was 950 p.s.i. There was obtained from this reaction 11 parts (44% conversion) of yellow solid. Ten parts of this material was placed in a sublimer and heated to 70–90° C. (1 mm. Hg pressure) for a period of 20 hours. There was obtained 1.60 parts of orange colored sublimate which when recrystallized from methanol yielded 0.57 part of a white trimer of perfluoro-2-butyne and crystallizing in small plates melting at 205–209° C.

*Analysis.*—Calcd. for $C_{12}F_{18}$: C, 29.6; F, 70.4. Found: C, 30.0; F, 69.3.

The volatility of this material was such that a mass spectral analysis could readily be performed. This analysis showed the presence of the parent ion of mass 486 and a pattern of lower mass ions logically derived from it, thus substantiating the trimeric formula. An examination of this material by nuclear magnetic resonance spectroscopy indicated the presence of only one kind of fluorine in the molecule. Infrared absorption bands occur at 12.45 microns, 13.4 microns and 13.8 microns. All of these observations substantiate that this trimer is hexakis(trifluoromethyl)benzene.

Example II

A mixture of 25 parts of perfluoro-2-butyne and 1 part of triphenylphosphine nickel carbonyl was heated at 275° C. in an 80 ml. stainless steel pressure reaction vessel for a period of 16 hours. There was obtained 13 parts of a moist black solid. A portion of this (9.3 parts) when heated in a sublimation apparatus at 80° C., 0.1–0.2 mm. Hg pressure for several hours, yielded 3 parts of yellow sublimate. Recrystallization from methanol yielded 1.6 parts of white crystalline hexakis(trifluoromethyl)benzene melting at 209–211° C. Mass spectral analysis confirmed that this material was a trimer of perfluoro-2-butyne.

Example III

An 80 cc. stainless steel bomb containing 25 g. (0.155 mole) of perfluoro-2-butyne was heated for 7 hours at 275° C. and 7 hours at 285° C. A pressure drop from 905 p.s.i. at 275° C. to 390 p.s.i. at 285° C. occurred during this time. After cooling and venting the bomb, there was obtained 15.1 g. of fluffy solid, 14 g. of which was sublimed as follows:

| Fraction | Temp., °C. | Pressure, mm. | Time, hrs. | Sublimate |
|---|---|---|---|---|
| A | 60-65 | 1 | 2 | 0.81 g. crystals and oil. |
| B | 100 | 1 | 2 | 5.47 g. crystals and oil. |
| C | 100-200 | 1 | 1 | 0.56 g. orange solid. |
| Residue | | | | 5.74 g. brown powder. |

Fraction A was extracted with pentane; the 0.42 g. of material remained melted at 102-190° C. Of this 0.29 g. was recrystallized from acetone, giving 0.12 g. of colorless crystal (I), M.P. 113-114° C. Pentane extraction of fraction B gave 3.53 g. of colorless crystals (II), M.P. 210-212° C. Mass spectrometry analysis of II showed the compound to be the trimer of perfluoro-2-butyne, the pattern being same as that of the trimer prepared in Example II.

The ultraviolet spectrum of the trimer in ethanol has lambda $_{max}$ 2870 A., log epsilon $_{max}$ 2.2. The trimer crystals are monoclinic. There are four formula weights per unit cell. The space group is $C_{2h}^5 P2_{1/c}$; $a_0=9.42$, $b_0=16.54$, $c_0=8.98$. The $\beta$ angle is 99.5°. Assuming a molecular weight of 486.24, the X-ray density is 2.33. The density at 25° C. ("Ultracene") is 2.260.

The trimer is characterized by an n-m-r spectrum (in acetone) having a $F^{19}$ resonance at +945 c.p.s. at 40 mc., relative to trifluoroacetic acid=0.

Mass spectrometry analysis of I indicates that it is a tetramer of perfluoro-2-butyne. The infrared spectrum of the tetramer (KBr wafer) has a band at 6.2µ (double bond), as well as bands at 7.64µ, 7.70µ, 7.86µ, 9.0µ, 9.50µ, 10.25µ, 12.14µ, 12.92µ, 13.05µ, 13.19µ, and 14.16µ. Strong absorption also occurs in the 8.1-8.5µ region.

The n-m-r spectrum has 2 fluorine peaks in a ratio of ca. 3.6/1. The ultraviolet spectrum of I has strong absorption with lambda $_{max}$ at 315µ, not too unreasonable absorption for structure I-A.

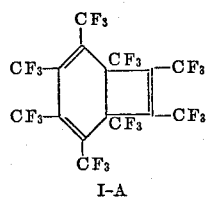

I-A

However, the infrared spectrum of I and the fact that it is more volatile than trimer II would seem more consistent with the structure I-B.

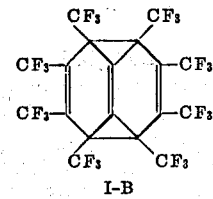

I-B

The tetramer crystals are orthorhombic. There are four formula weights per unit cell. The probable space group is $D_2^4$ $P2_12_12_1$; $a_0=16.44$, $b_0=14.74$, $c_0=7.90$. Assuming a molecular weight of 648.16, the X-ray density is 2.24.

The tetramer is characterized by an n-m-r spectrum (in hexane) having 2 $F^{19}$ resonances occurring at + 693 c.p.s. and +800 c.p.s. (both at 40 mc., relative to trifluoroacetic acid=0).

The trimers and tetramers produced in accord with this invention are useful as heat transfer media, as dielectric materials, and they can be formed in single crystals for semi-conductor applications.

I claim:

1. A cyclic derivative of a bis(perfluoroalkyl) acetylene having the general formula

wherein $n$ is from 0 to 4, said cyclic derivative being characterized by a carbon ring structure in which all free valences are substituted by perfluoroalkyl groups, having the general formula

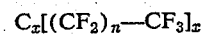

where $x$ is a number of the class consisting of 6 and 8 and $n$ is a number from 0 to 4.

2. The cyclic derivative set forth in claim 1 wherein the bis(perfluoroalkyl)acetylene is perfluoro-2-butyne and $n$ is 0.

3. The cyclic trimer of a bis(perfluoroalkyl)acetylene, said trimer having the general formula

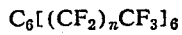

wherein $n$ is a number from 0 to 4.

4. Hexakis(trifluoromethyl)benzene having a melting point at 209 to 212° C.

5. The cyclic tetramer of a bis(perfluoroalkyl)acetylene, said tetramer having the general formula

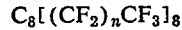

wherein $n$ is a number from 0 to 4.

6. Octakis(trifluoromethyl)bicyclo-octatriene having a melting point at 113-114° C.

7. The process of preparing cyclic derivatives from bis(perfluoroalkyl)acetylenes which comprises heating under pressure a bis(perfluoroalkyl)acetylene having the general formula

wherein $n$ is 0 to 4, to a temperature of 250° C. to 300° C.

References Cited in the file of this patent

McBee et al.: "Ind. and Eng. Chem.," volume 39, pages 378-380 (1947).